US005630316A

United States Patent [19]

Itsuji et al.

[11] Patent Number: 5,630,316

[45] Date of Patent: May 20, 1997

[54] HYDRAULIC DRIVING APPARATUS USING A BLADDER-TYPE ACCUMULATOR WITH AN IMPROVED SAFETY

[75] Inventors: Yoshiyasu Itsuji; Shinji Terada, both of Chiba, Japan

[73] Assignee: Sumitomo Heavy Industries, Ltd., Tokyo, Japan

[21] Appl. No.: 558,476

[22] Filed: Nov. 16, 1995

[30] Foreign Application Priority Data

Nov. 16, 1994 [JP] Japan .................................... 6-281769
Nov. 16, 1994 [JP] Japan .................................... 6-281772

[51] Int. Cl.[6] .................................................. F16D 31/02

[52] U.S. Cl. ................................ 60/418; 60/468; 60/494

[58] Field of Search ............................ 60/413, 418, 464, 60/468, 494, 422

[56] References Cited

U.S. PATENT DOCUMENTS

| | | | |
|---|---|---|---|
| 3,964,260 | 6/1976 | Williams et al. | 60/418 X |
| 4,202,174 | 5/1980 | Grigorenko et al. | 60/413 |
| 5,034,892 | 7/1991 | Saotome | 60/418 X |
| 5,301,505 | 4/1994 | Wright | 60/413 X |

FOREIGN PATENT DOCUMENTS

| | | | |
|---|---|---|---|
| 7195901 | 12/1982 | Japan | 60/418 |

*Primary Examiner*—Hoang Nguyen
*Attorney, Agent, or Firm*—Burns, Doane, Swecker & Mathis, LLP

[57] ABSTRACT

In a hydraulic driving apparatus with a bladder-type accumulator connected to a fluid supply pipe extending from a hydraulic fluid source to at least one actuator, the apparatus comprises a hydraulic pressure sensor attached to the fluid supply pipe in the vicinity of the bladder-type accumulator and a control unit responsive to a detected pressure detected by the hydraulic pressure sensor for controlling the hydraulic fluid source. The control unit carries out the steps of judging, at the start of the hydraulic driving apparatus, an initial gas pressure supplied to the bladder-type accumulator with reference to a gradient of variation of the detected pressure detected by the hydraulic pressure sensor; monitoring, during a normal operation of the hydraulic driving apparatus, a difference ΔP between the initial gas pressure and the detected pressure; and judging occurrence of a trouble when the difference ΔP becomes smaller than a predetermined first difference ΔP1 or when the difference ΔP becomes greater than a predetermined second difference ΔP2 (ΔP1<ΔP2).

7 Claims, 4 Drawing Sheets

HYDRAULIC DRIVING APPARATUS USING A BLADDER-TYPE ACCUMULATOR WITH AN IMPROVED SAFETY

BACKGROUND OF THE INVENTION

This invention relates to a hydraulic driving apparatus using a bladder-type accumulator and, in particular, to an improvement in safety of the bladder-type accumulator.

Generally, a hydraulic driving apparatus is provided with an accumulator. The accumulator is a sort of vessel for receiving hydraulic fluid supplied from a hydraulic fluid source and for accumulating or reserving the hydraulic fluid in a pressurized condition. The accumulator serves to absorb pulsation of a hydraulic pressure and to achieve a quick start of hydraulic driving operation without using a large-scale pump. As the accumulator of the type described, a bladder-type accumulator is well known.

The bladder-type accumulator comprises a pressure vessel and a rubber bag (called a bladder) contained in the pressure vessel. A gas (for example, nitrogen gas) is confined in the bladder at a predetermined pressure. The bladder-type accumulator is connected to a fluid supply pipe between the hydraulic fluid source and an actuator. In the bladder-type accumulator, the bladder is expanded and compressed in response to pressure variation of the hydraulic fluid surrounding the bladder.

In the meanwhile, the bladder-type accumulator of the type described is often damaged due to two factors which will presently be described. In the first place, the hydraulic fluid may leak from anywhere in a hydraulic circuit. In this event, the hydraulic fluid within the pressure vessel is completely discharged out of the pressure vessel. As a consequence, the bladder is rapidly expanded until it is pressed against an internal wall of the pressure vessel. This state is called "zero-pressure down". In the second place, the bladder may excessively be compressed by the hydraulic fluid when the hydraulic fluid has an increased pressure. In this event, the bladder is partially deformed and acutely bent. This state is called "overcompression".

In order to prevent the bladder-type accumulator from being damaged due to the above-mentioned factors, the hydraulic pressure in the pressure vessel must be kept within a predetermined range. To this end, it is proposed to provide the hydraulic fluid source with an unload/onload switching section. The unload/onload switching section serves to adjust a flow rate of the hydraulic fluid supplied from the hydraulic fluid source to the bladder-type accumulator. The unload/onload switching section is controlled by a control unit. The control unit is supplied from a pressure sensor with a pressure detection signal representative of a hydraulic pressure in the fluid supply pipe (preferably in the vicinity of the accumulator).

However, even if the unload/onload switching section is provided as described above, the following disadvantages still remain unsolved.

First, confinement of the gas in the bladder may be insufficient because a gas confinement pressure is confirmed by an operator periodically or on demand. Sometimes, the operator is unaware of decrease of the gas confinement pressure resulting from leakage of the gas. It is noted here that the pressure sensor detects the hydraulic pressure in the fluid supply pipe alone and the gas confinement pressure in the bladder can not be detected. This results in occurrence of the overcompression in the bladder-type accumulator. The overcompression may also be caused when the gas confinement pressure in the bladder is lowered by a decrease of an ambient temperature or a hydraulic fluid temperature. On the contrary, confinement of an excessive amount of the gas in the bladder or an increase of the ambient temperature or the hydraulic fluid temperature causes the zero-pressure down.

Second, an operation of the actuator may require consumption of the hydraulic fluid beyond an allowable range. In this event the hydraulic pressure within the pressure vessel is decreased to cause the zero-pressure down.

SUMMARY OF THE INVENTION

It is an object of this invention to provide a hydraulic driving apparatus using a bladder-type accumulator with an improved safety.

Other objects of this invention will become clear as the description proceeds.

According to this invention, there is provided a hydraulic driving apparatus with a bladder-type accumulator connected to a fluid supply pipe extending from a hydraulic fluid source to at least one actuator, the hydraulic driving apparatus comprising a hydraulic pressure sensor attached to the fluid supply pipe in the vicinity of the bladder-type accumulator; and a control unit responsive to a detected pressure detected by the hydraulic pressure sensor for controlling the hydraulic fluid source to adjust a fluid flow rate; the control unit carrying out the steps of judging, at the start of the hydraulic driving apparatus, an initial gas pressure supplied to the bladder-type accumulator with reference to a gradient of variation of the detected pressure detected by the hydraulic pressure sensor; monitoring, during a normal operation of the hydraulic driving apparatus, a difference $\Delta P$ between the initial gas pressure and the detected pressure; and judging occurrence of a trouble when the difference $\Delta P$ becomes smaller than a predetermined first difference $\Delta P1$ or when the difference $\Delta P$ becomes greater than a predetermined second difference $\Delta P2$ ($\Delta P1 < \Delta P2$).

DESCRIPTION OF THE PREFERRED EMBODIMENT

Figure 1:
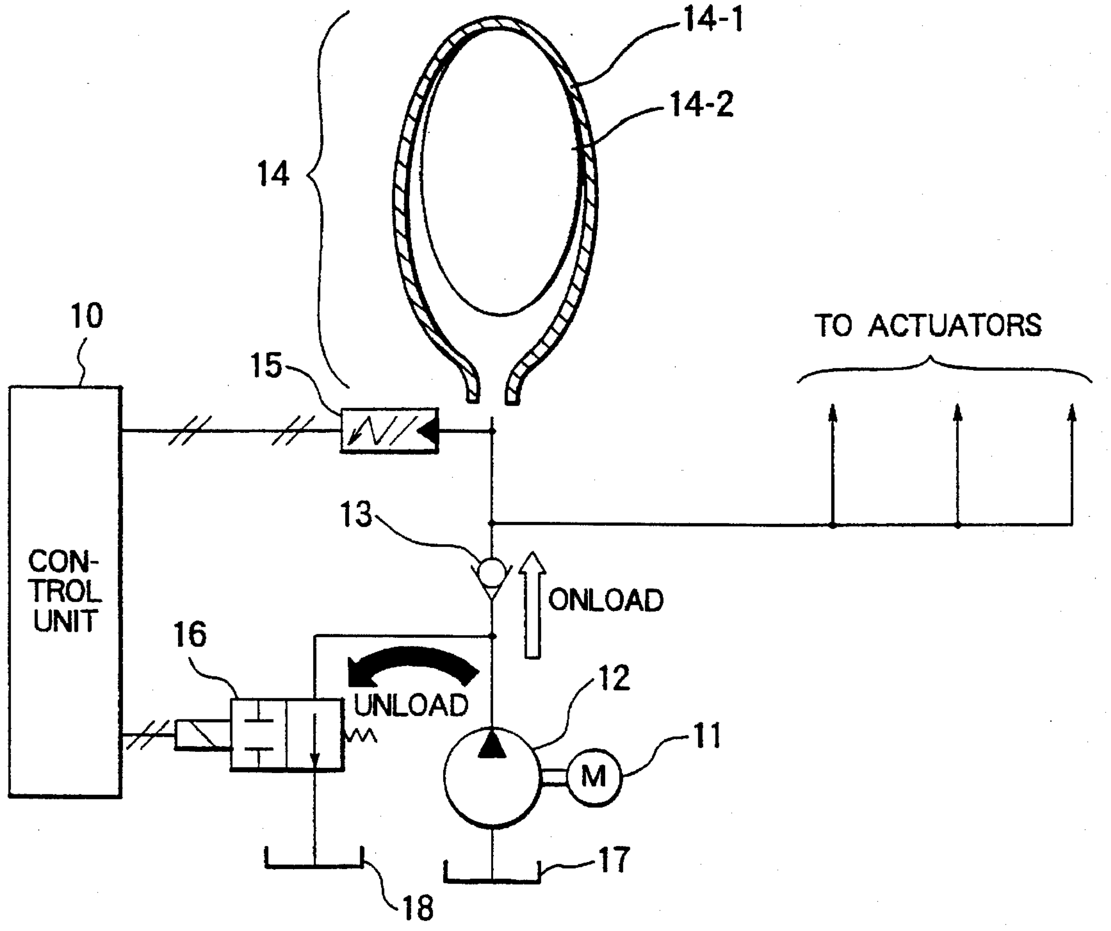
FIG. 1 schematically shows a structure of a hydraulic driving apparatus according to one embodiment of this invention.
Figure 2:
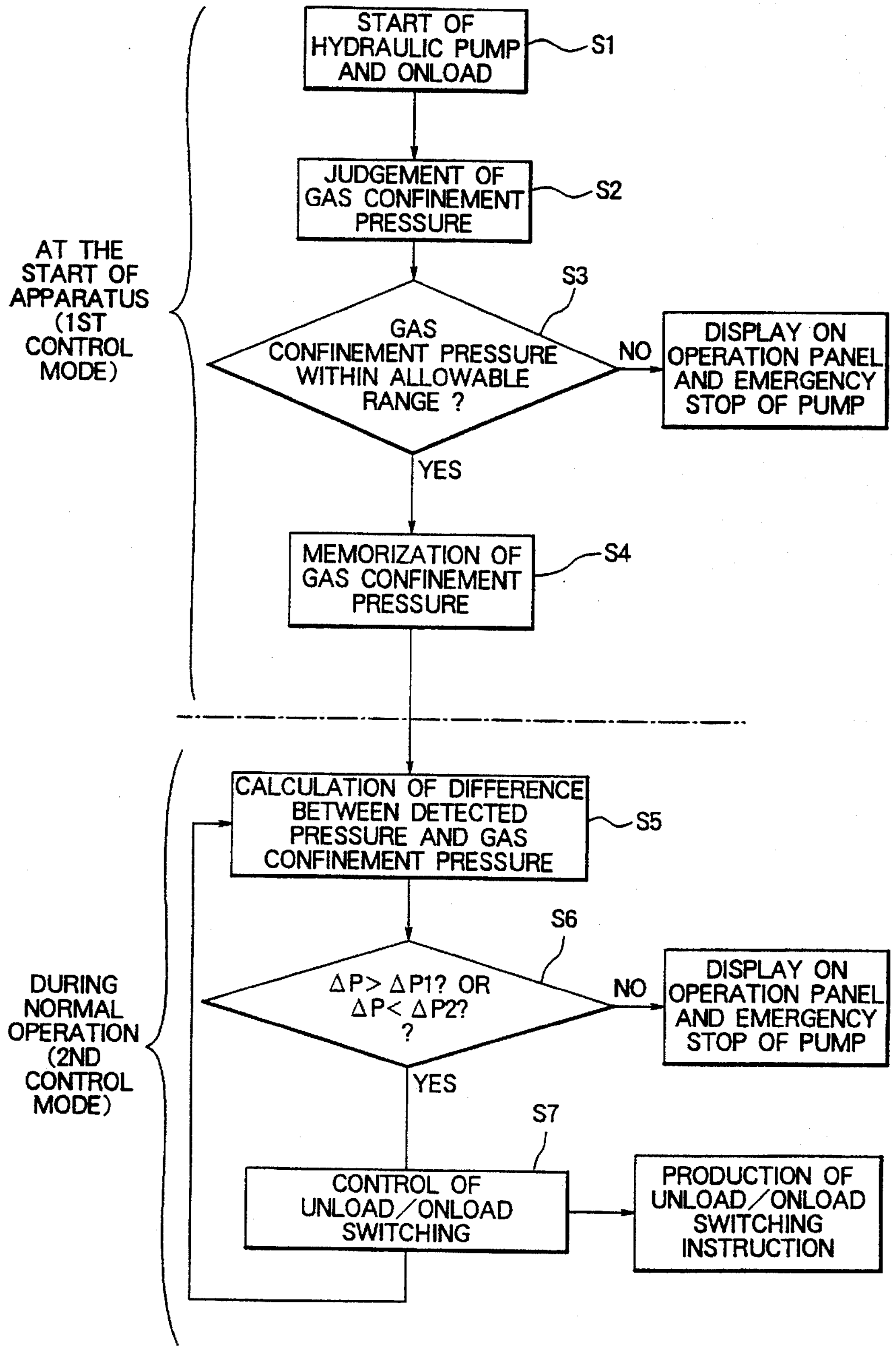
FIG. 2 is a flow chart for describing a control operation of a control unit illustrated in FIG. 1.
Figure 3:
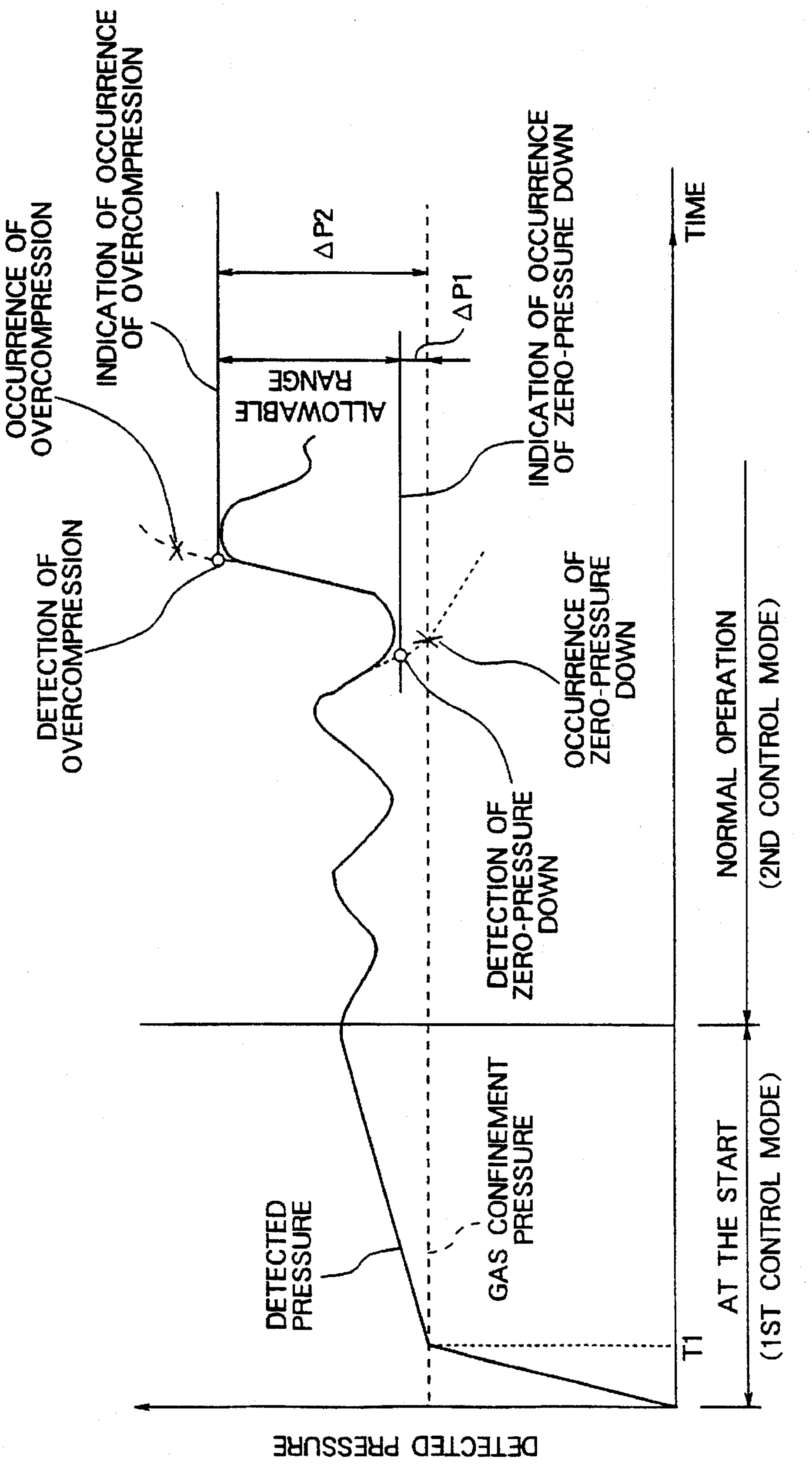
FIG. 3 shows a variation of a detected pressure detected by a hydraulic pressure sensor illustrated in FIG. 1.

Referring to FIGS. 1 through 3, description will be made as regards a hydraulic driving apparatus according to one embodiment of this invention. In FIG. 1, a motor 11 is for driving a hydraulic pump 12 having a discharge port connected to a check valve 13 through a fluid supply pipe. Downstream of the check valve 13, the fluid supply pipe is branched to supply a hydraulic fluid to a bladder-type accumulator 14 on one hand and to a plurality of actuators on the other hand. In the vicinity of the bladder-type accumulator 14, the fluid supply pipe is provided with a hydraulic pressure sensor 15 for detecting a hydraulic pressure in the fluid supply pipe. The fluid supply pipe between the discharge port of the hydraulic pump 12 and the check valve 13 is also branched to be connected to an unload/ onload switching valve 16. A combination of the motor 11, the hydraulic pump 12, the check valve 13, and the unload/onload switching valve 16 serves as a hydraulic fluid source. The hydraulic pressure sensor 15 produces a detection signal supplied to a control unit 10.

The control unit 10 is responsive to the detection signal from the hydraulic pressure sensor 15 and controls a switching operation of the unload/onload switching valve 16. In addition, the control unit 10 monitors the hydraulic pressure represented by the detection signal to carry out another control operation which will later be described.

Control of the switching operation will now be described. When the unload/onload switching valve 16 is closed, the hydraulic fluid is supplied from a tank 17 to the actuators as depicted by a white arrow in the figure. On the other hand, when the unload/onload switching valve 16 is opened, the hydraulic fluid is bypassed through the unload/onload switching valve 16 to flow into a return fluid tank 18 as depicted by a black arrow in the figure. Then, the hydraulic fluid is returned to the tank 17 via a passage which is not illustrated in the figure. The control unit 10 is further operable to make a display unit (not shown) display an indication of occurrence of a trouble and to control start/stop of the motor 11.

As illustrated, the bladder-type accumulator 14 comprises a pressure vessel 14-1 and a bladder 14-2 with a nitrogen gas confined therein at a predetermined pressure. The bladder-type accumulator 14 is operable to absorb pulsation of the hydraulic pressure in the fluid supply pipe and to achieve a quick start of hydraulic driving operation.

Referring to FIGS. 2 and 3 in addition, description will be made as regards the control operation of the control unit 10. The control operation includes a first control mode at the start of the hydraulic driving apparatus and a second control mode during a normal operation subsequent thereto.

In the first control mode, the hydraulic pump 12 is activated and simultaneously the unload/onload switching valve 16 is closed to select an onload condition (step S1). As a consequence, the hydraulic pressure in the fluid supply pipe rapidly increases as illustrated in FIG. 3. It is assumed here that the gas is confined in the bladder 14-2 at a predetermined pressure. In this event, the hydraulic pressure in the fluid supply pipe rapidly increases until the predetermined pressure is reached. When the hydraulic pressure reaches the predetermined pressure, variation of the hydraulic pressure becomes gentle. In view of the above, the hydraulic pressure sensor 15 detects as a detected pressure the hydraulic pressure in the fluid supply pipe. The control unit 10 monitors variation of the detected pressure. It is assumed here that the variation of the detected pressure becomes gentle at a time instant T1. In this event, it is judged that the detected pressure at the time instant T1 is equal to a gas confinement pressure in the bladder 14-2 (step S2). The detected pressure at the time instant T1 may be called an initial gas pressure. Such judgement can be carried out in various manners. For example, a differential value of a variation amount of the detected pressure is monitored to find a particular time instant when the differential value drastically changes. It is decided that the detected pressure at the particular time instant is equal to the gas confinement pressure as described above.

Then, the control unit 10 judges whether or not the gas confinement pressure thus determined is within a predetermined allowable range (step S3). If it is judged that the gas confinement pressure is within the predetermined allowable range, the operation proceeds to a step S4. If the gas confinement pressure does not fall within the predetermined allowable range, the control unit 10 makes the display unit display an indication of occurrence of a trouble and stops the motor 11. In the step S4, the gas confinement pressure thus determined is memorized in a memory (not shown) in the control unit 10. Then, the operation in the first control mode is completed.

Then, the second control mode during the normal operation is started with the onload condition continued. In a step S5, the control unit 10 calculates a difference $\Delta P$ between the detected pressure and the gas confinement pressure memorized in the memory in the step S4.

In a step S6, the control unit 10 judges whether or not the difference $\Delta P$ is greater than a predetermined first difference $\Delta P1$ ($\Delta P1>0$) and whether or not the difference $\Delta P$ is smaller than a predetermined second difference $\Delta P2$ ($\Delta P2>\Delta P1$). The first difference $\Delta P1$ is a value selected so that the hydraulic pressure in the fluid supply pipe does not become lower than the gas confinement pressure. The second difference $\Delta P2$ is a value selected so that the hydraulic pressure in the fluid supply pipe does not much exceed the gas confinement pressure. Thus, the first and the second differences $\Delta P1$ and $\Delta P2$ define lower and upper limits to prevent occurrence of zero-pressure down and overcompression, respectively. The first and the second differences $\Delta P1$ and $\Delta P2$ are preliminarily memorized in the memory in the control unit 10.

As illustrated in FIG. 3, if the detected pressure, namely, the hydraulic pressure in the fluid supply pipe is reduced to become lower than the gas confinement pressure ($\Delta P<0$), the zero-pressure down will be caused to occur as depicted by a dashed-line curve. However, the control unit 10 makes the display unit display an indication of occurrence of a trouble and stops the motor 11 well in advance, namely, at the time when the detected pressure is higher than the gas confinement pressure by $\Delta P1$ ($\Delta P=\Delta P1$). Thus, occurrence of the zero-pressure down is substantially completely prevented. It is assumed here that the hydraulic pressure within the pressure vessel 14-1 is further reduced after the motor 11 is stopped and that the bladder 14-2 is expanded until it is pressed against an internal wall of the pressure vessel 14-1. However, the bladder 14-2 is then kept standstill and is prevented from repeated collision against the internal wall of the pressure vessel 14-1 due to further fluctuation of the hydraulic pressure which might occur if the motor 11 is not stopped. Thereafter, the apparatus is restarted after an abnormal part is confirmed and repaired to recover a normal state.

On the other hand, if the detected pressure increases to exceed an overcompression level greater than a sum of the gas confinement pressure and the second difference $\Delta P2$ ($\Delta P>\Delta P2$), the overcompression may be caused to occur. However, the control unit 10 makes the display unit display an indication of occurrence of a trouble and stops the motor 11 well in advance, namely, at the time when the detected pressure is higher than the gas confinement pressure by $\Delta P2$ ($\Delta P=\Delta P2$). Thus, the overcompression is prevented. Thereafter, the apparatus is restarted after an abnormal part is confirmed and repaired to recover a normal state.

When it is judged in the step S6 that $\Delta P>\Delta P1$ and $\Delta P<\Delta P2$, $\Delta P$ has a normal value within an allowable range. The operation then proceeds to a step S7. In the step S7, an unload/onload switching operation is controlled in response to the detected pressure in the manner similar to the prior art. Specifically, in response to the detected pressure detected by the pressure sensor 15, the control unit 10 judges whether or not the switching operation is required. If it is judged that the switching operation is required, a switching instruction signal is delivered to the unload/onload switching valve 16. The operation returns to the step S5.

Although this invention has been described above in connection with one preferred embodiment thereof, it will be understood that this invention is not restricted thereto. For example, the hydraulic fluid source may comprise a hydraulic pump of a variable discharge flow rate controlled by the control unit 10 instead of a combination of the hydraulic pump 12 and the unload/onload switching valve 16.

Generally, the hydraulic driving apparatus is adapted to an apparatus, such as an injection molding machine, which automatically repeats a predetermined sequential operation. However, it will be noted here that this invention is applicable to any hydraulic driving apparatus using a bladder-type accumulator.

As thus far been described, according to this invention, it is possible to reliably prevent occurrence of the zero-pressure down and the overcompression which may result in a damage and a reduced lifetime of the bladder-type accumulator. Thus, a durability is improved. In addition, the gas confinement pressure in the bladder can be automatically monitored without resorting to a periodical check by an operator.

Next referring to FIG. 4, another embodiment will be described in which the bladder-type accumulator illustrated in FIG. 1 is further improved in safety.

Figure 4:
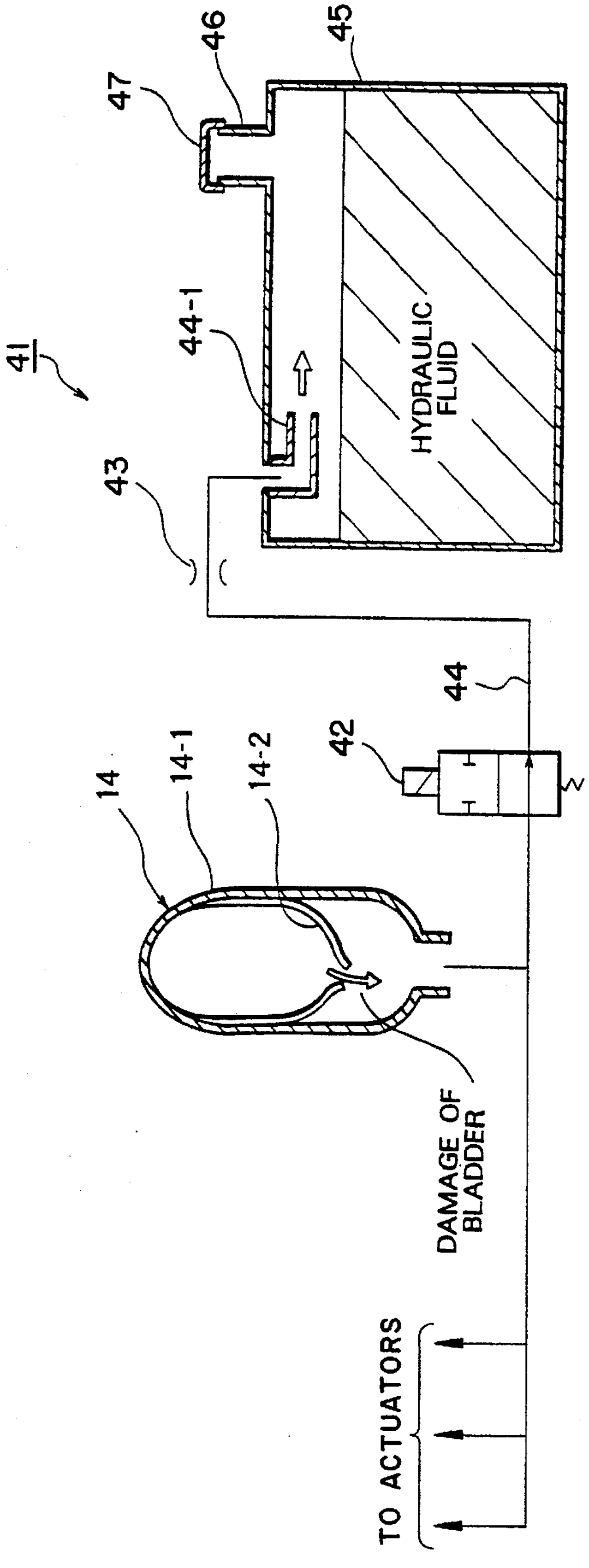
FIG. 4 schematically shows a structure of a bladder-type accumulator having a pressure relief unit according to another embodiment of this invention.

Referring to FIG. 4, the bladder-type accumulator 14 is provided with a pressure relief unit 41. The pressure relief unit 41 comprises a switching valve 42, a throttle valve 43, a hydraulic fluid extracting pipe 44, and a hydraulic fluid accumulation tank 45. The hydraulic fluid extracting pipe 44 is connected between the hydraulic fluid accumulation tank 45 and a hydraulic fluid outlet port of the pressure vessel 14-1 via the switching valve 42 and the throttle valve 43. At a junction between the hydraulic fluid extracting pipe 44 and the hydraulic fluid accumulation tank 45, a hydraulic fluid outlet portion 44-1 is formed at a level higher than a fluid surface in the hydraulic fluid accumulation tank 45. The hydraulic fluid outlet portion 44-1 is horizontally extended to inject the hydraulic fluid in a horizontal direction. A breathing pipe 46 of a chimney-like shape extends upwards from the top surface of the hydraulic fluid accumulation tank 45. The breathing pipe 46 has an upper opening covered by a cap member 47. The breathing pipe 46 has a diameter greater than that of a conventional vent pipe. On one hand, the cap member 47 serves to prevent foreign particles outside the tank from invading through the breathing pipe 46. Because the cap member 47 has such a weight that the cap member 47 is opened when the internal pressure in the hydraulic fluid accumulation tank 45 exceeds a predetermined value, the cap member 47 exhibits another effect which will later be described.

When the hydraulic driving apparatus is stopped for the purpose of check and repair, the pressure relief unit 41 of the above-mentioned structure introduces the hydraulic fluid in the pressure vessel 14-1 into the hydraulic fluid accumulation tank 45 with the switching valve 42 opened. When the bladder 14-2 is normal, the hydraulic fluid is introduced into the hydraulic fluid accumulation tank 45 after the pressure of the hydraulic fluid is lowered by the throttle valve 43.

Even if the bladder 14-2 is damaged during this pressure relief operation and the gas confined in the bladder 14-2 leaks out, a mixture of the gas and the hydraulic fluid is throttled by the throttle valve 43 to be reduced in pressure. In the hydraulic fluid accumulation tank 45, the mixture of the gas and the hydraulic fluid with a reduced pressure is injected in a horizontal direction from the outlet portion 44-1 formed at a level higher than the fluid surface. Accordingly, the hydraulic fluid accumulated in the hydraulic fluid accumulation tank 45 is never blown up. In addition, the breathing pipe 46 has a large diameter and extends upward as described above. Accordingly, the hydraulic fluid in the hydraulic fluid accumulation tank 45 is never blown out through the breathing pipe 46. When the gas enters into the hydraulic fluid accumulation tank 45 due to the damage of the bladder 14-2, the internal pressure is increased so that the cap member 47 is opened and removed from the breathing pipe 46. Thus, the hydraulic fluid accumulation tank 45 is prevented from being deformed or damaged due to excessive increase of the internal pressure.

By the use of the bladder-type accumulator with the pressure relief unit described above, even if the compressed gas leaks into the fluid supply pipe due to the damage of the bladder and enters into the hydraulic fluid accumulation tank, it is possible to discharge the gas from the hydraulic fluid accumulation tank without blowing out the hydraulic fluid accumulated therein. In addition, the hydraulic fluid accumulation tank is prevented from being deformed or damaged even if the internal pressure is increased by the gas entering therein.

What is claimed is:

1. A hydraulic driving apparatus with a bladder-type accumulator connected to a fluid supply pipe extending from a hydraulic fluid source to at least one actuator, said hydraulic driving apparatus comprising:

a hydraulic pressure sensor attached to said fluid supply pipe in the vicinity of said bladder-type accumulator; and a control unit responsive to a detected pressure detected by said hydraulic pressure sensor for controlling said hydraulic fluid source to adjust a fluid flow rate;

said control unit carrying out the steps of:

judging, at the start of said hydraulic driving apparatus, an initial gas pressure supplied to said bladder-type accumulator with reference to a gradient of variation of the detected pressure detected by said hydraulic pressure sensor;

monitoring, during a normal operation of said hydraulic driving apparatus, a difference $\Delta P$ between said initial gas pressure and said detected pressure; and judging occurrence of a trouble when said difference $\Delta P$ becomes smaller than a predetermined first difference $\Delta P1$ or when said difference $\Delta P$ becomes greater than a predetermined second difference $\Delta P2$, where $\Delta P2$ is greater than $\Delta P1$.

2. A hydraulic driving apparatus with a bladder-type accumulator as claimed in claim 1, wherein said control unit judges that the detected gas pressure is equal to said initial gas pressure at the time when the gradient of variation of said detected pressure becomes gentle.

3. A hydraulic driving apparatus with a bladder-type accumulator as claimed in claim 1, wherein said hydraulic fluid source comprises:

a hydraulic pump;

a check valve attached to said fluid supply pipe between a discharge port of said hydraulic pump and said check valve, said switching valve being opened and closed under control of said control unit to switch unload and onload conditions one from another.

4. A hydraulic driving apparatus with a bladder-type accumulator as claimed in claim 2, wherein said hydraulic fluid source comprises:

a hydraulic pump;

a check valve attached to said fluid supply pipe between a discharge port of said hydraulic pump and said check valve, said switching valve being opened and closed under control of said control unit to switch unload and onload conditions one from another.

5. A hydraulic driving apparatus with a bladder-type accumulator as claimed in claim 3, wherein said bladder-type accumulator comprises a pressure relief unit;

said pressure relief unit comprising a switching valve, a throttle valve, a hydraulic fluid extracting pipe connected through said switching valve and said throttle valve to a hydraulic fluid outlet port of a pressure vessel of said accumulator, and a hydraulic fluid accumulation tank connected to said hydraulic fluid extracting pipe;

said hydraulic fluid extracting pipe being provided with a hydraulic fluid outlet portion formed at a junction between said hydraulic fluid extracting pipe and said hydraulic fluid accumulator tank and located at a level higher than a fluid surface to inject the hydraulic fluid in a horizontal direction;

said hydraulic fluid accumulation tank being provided at its top surface with a breathing pipe extending upwards and with a cap member which covers an upper opening of said breathing pipe but is removable in response to a predetermined internal pressure.

6. A hydraulic driving apparatus with a bladder-type accumulator as claimed in claim 4, wherein said bladder-type accumulator comprises a pressure relief unit;

said pressure relief unit comprising a switching valve, a throttle valve, a hydraulic fluid extracting pipe connected through said switching valve and said throttle valve to a hydraulic fluid outlet port of a pressure vessel of said accumulator, and a hydraulic fluid accumulation tank connected to said hydraulic fluid extracting pipe;

said hydraulic fluid extracting pipe being provided with a hydraulic fluid outlet portion formed at a junction between said hydraulic fluid extracting pipe and said hydraulic fluid accumulation tank and located at a level higher than a fluid surface to inject the hydraulic fluid in a horizontal direction;

said hydraulic fluid accumulation tank being provided at its top surface with a breathing pipe extending upwards and with a cap member which covers an upper opening of said breathing pipe but is removable in response to a predetermined internal pressure.

7. A bladder-type accumulator connected to a fluid supply pipe between a hydraulic fluid source and at least one actuator and having a pressure relief unit;

said pressure relief unit comprising a switching valve, a throttle valve, a hydraulic fluid extracting pipe connected through said switching valve and said throttle valve to a hydraulic fluid outlet port of a pressure vessel of said accumulator, and a hydraulic fluid accumulation tank connected to said hydraulic fluid extracting pipe;

said hydraulic fluid extracting pipe being provided with a hydraulic fluid outlet portion formed at a junction between said hydraulic fluid extracting pipe and said hydraulic fluid accumulation tank and located at a level higher than a fluid surface to inject the hydraulic fluid in a horizontal direction;

said hydraulic fluid accumulation tank being provided at its top surface with a breathing pipe extending upwards and with a cap member which covers an upper opening of said breathing pipe but is removable in response to a predetermined internal pressure.

* * * * *